United States Patent [19]

Trubiano

[11] Patent Number: 4,742,943
[45] Date of Patent: May 10, 1988

[54] RETENTION CLAMP FOR SHOPPING CARTS

[75] Inventor: Antoine Trubiano, Montreal, Canada

[73] Assignee: Cari-All Inc., Quebec, Canada

[21] Appl. No.: 852,287

[22] Filed: Apr. 15, 1986

[51] Int. Cl.⁴ .............................................. G09F 3/00
[52] U.S. Cl. .................................... 224/277; 40/308
[58] Field of Search ............... 224/273, 277, 42.42; 40/308, 10 R; 281/45, 15 B; 206/44.11, 44 B, 102; 280/47.26

[56] References Cited

U.S. PATENT DOCUMENTS

| | | | |
|---|---|---|---|
| 380,002 | 3/1888 | Turner | 206/44.11 |
| 616,951 | 1/1899 | Mensch | 40/308 |
| 2,528,695 | 11/1950 | King | 281/45 |
| 3,609,893 | 10/1971 | Routzahn et al. | 40/308 X |

Primary Examiner—Henry J. Recla
Assistant Examiner—David Voorhees
Attorney, Agent, or Firm—Oblon, Fisher, Spivak, McClelland & Maier

[57] ABSTRACT

A retention clamp for attachment to a wire frame of a shopping cart to retain substantially flat articles, such as advertising papers and magazines against a wire wall section of the cart. The clamp comprises a pressure retention member to apply retention pressure at spaced apart areas of the flat articles captive between the wire wall section and the member. The retention member has a pressure-biasing attachment end engageable with straight wire members of the wire frame to maintain the retention member pressure biased against the wire frame to define a clamping jaw for retaining the substantially flat articles in the jaw between the retention member and the wire frame.

4 Claims, 2 Drawing Sheets

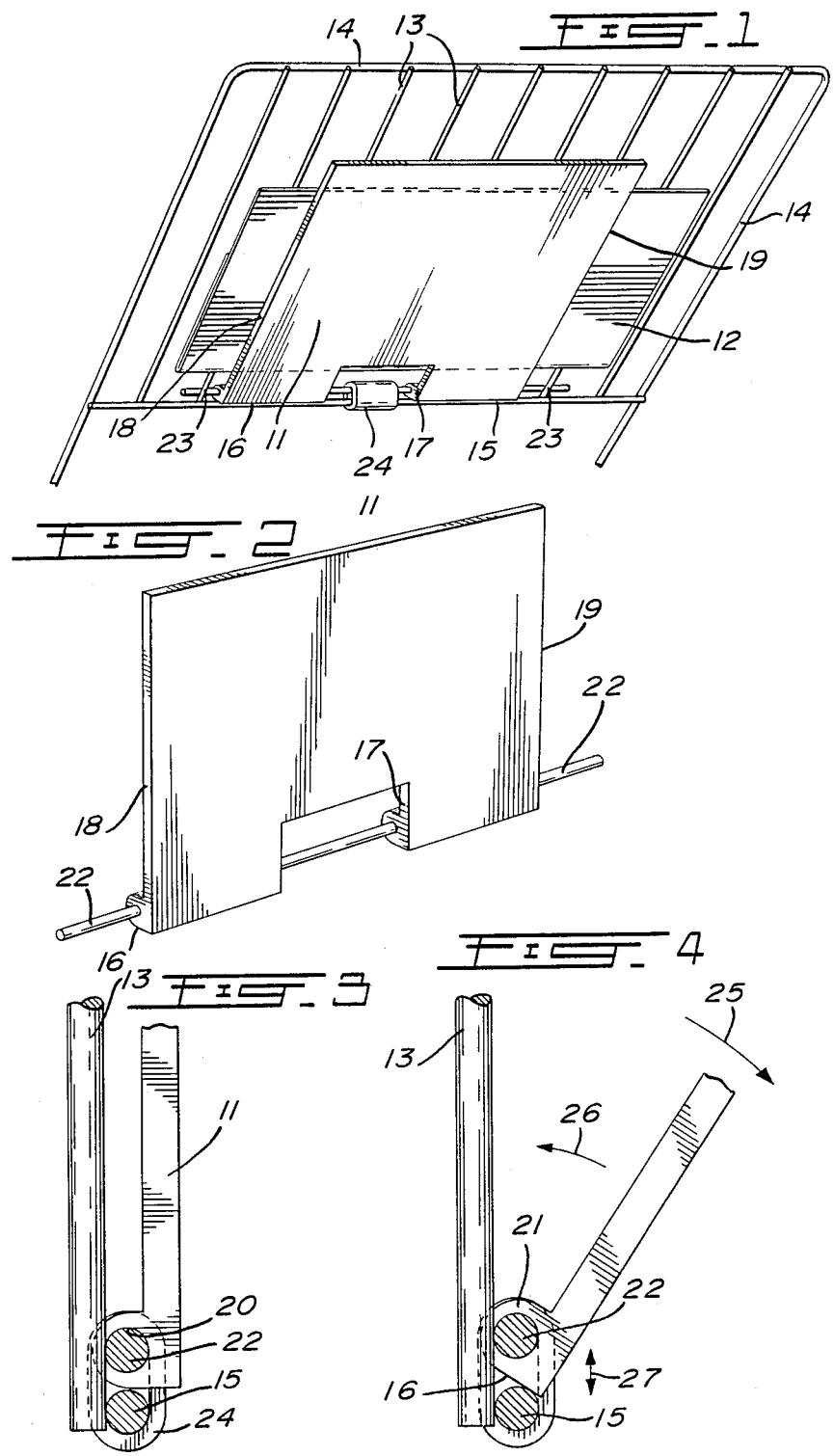

U.S. Patent May 10, 1988 Sheet 2 of 2 4,742,943
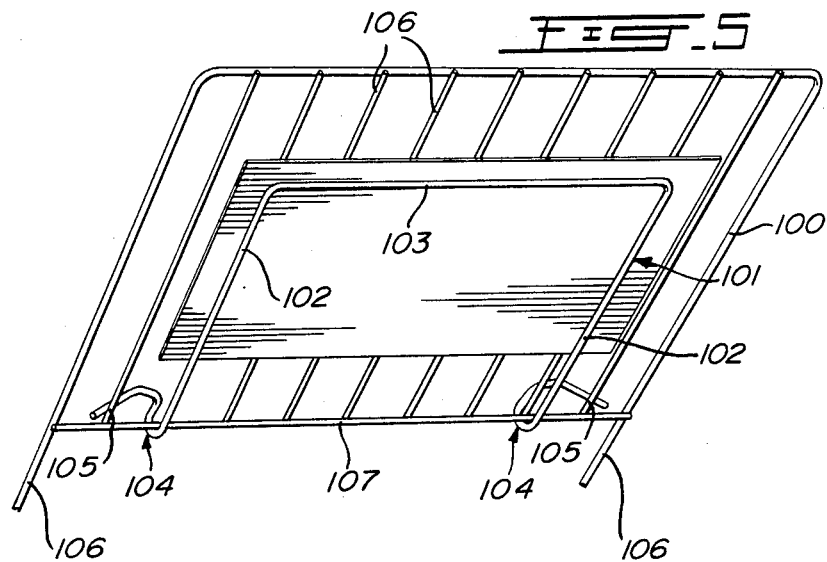
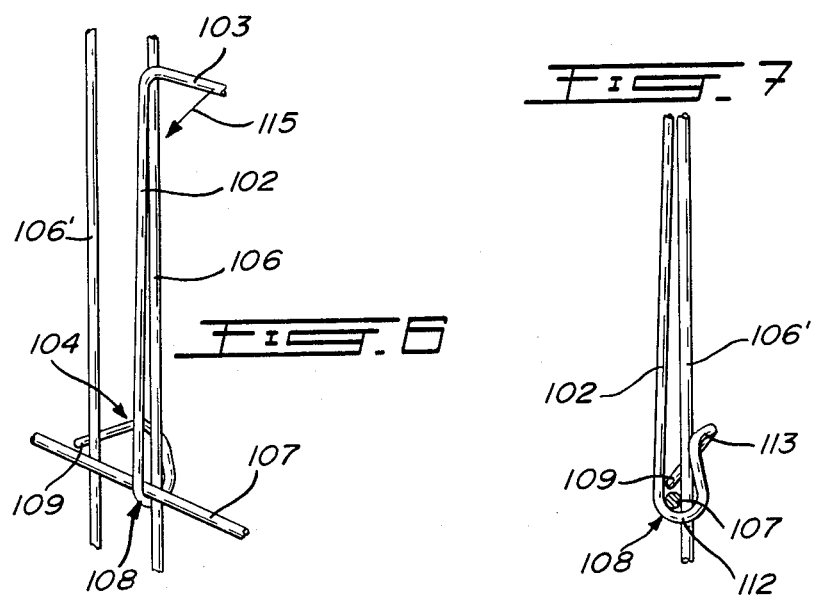
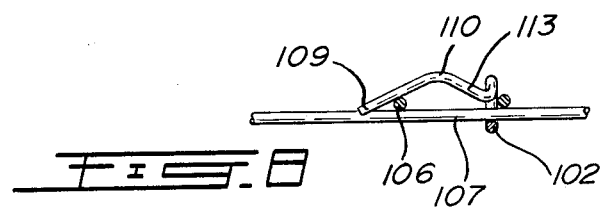

RETENTION CLAMP FOR SHOPPING CARTS

BACKGROUND OF INVENTION

1. Field of the Invention

The invention relates to an improvement in shopping carts, and more particularly to a rention clamp which is securable to the wire frame of the shopping cart, such as the gate of the cart, whereby to retain magazines, newspapers, flyers, or the like flat articles in a jaw formed by the retention clamp and the gate wall.

2. Description of Prior Art

It is customary in large shopping stores equipped with push carts to dispose in each cart a small newspaper flyer to advertise goods available in the store at special prices. Such newspaper flyers are usually placed on the bottom wall of the basket of the shopping cart. Often the user of the shopping cart will not take the time to look at the flyer or discard it. Also, when a plurality of shopping carts are nested one within the other, often these flyers are torn by the walls of the nested baskets or otherwise become crumpled and become an eye sore and are thus discarded. Accordingly, a percentage of these flyers do not serve their intended purpose, and mess up the store or the shopping cart nesting area.

In most shopping stores where carts are used there is also available magazines for purchase. These magazines are often placed in the shopping basket of the cart with other goods and often the magazines become damaged by the various articles in the basket.

SUMMARY OF INVENTION

It is a feature of the present invention to provide a retention clamp which is securable to a wire frame of a shopping cart wherein to hold newspapers, flyers, magazines, or the like articles to prevent damage thereto and for ease of access to them.

Another feature of the present invention is to provide a retention clamp for securement to the wire frame of the gate of a shopping cart, and which clamp is easy to install and is formed from a unitary wire.

According to the above features, from a broad aspect the present invention provides a retention clamp for attachment to a wire frame of a shopping cart to retain substantially flat articles, such as advertising papers and magazines against a wire wall section of the cart. The clamp comprises a pressure retention member to apply retention pressure at spaced apart areas of the flat articles captive between the wire wall section and the member. The retention member has a pressure-biasing attachment end engageable with straight wire members of the wire frame to maintain the retention member pressure biased against the wire frame to define a clamping jaw for retaining the substantially flat articles in the jaw between the retention member and the wire frame.

BRIEF DESCRIPTION OF DRAWINGS

The present invention will now be described with reference to the example thereof as illustrated in the accompanying drawings in which:

FIG. 1 is a perspective view showing the panel secured to the end gate of a shopping cart to hold a newspaper or the like article thereagainst;

FIG. 2 is a perspective view of the pressure retention panel constituting the retention clamp of the present invention;

FIG. 3 is a fragmented section view showing the pressure biasing attachment;

FIG. 4 is a similar section view as in FIG. 4 showing the action of the pressure biasing attachment;

FIG. 5 is a perspective view of the retention clamp of the present invention as secured to the gate of a shopping cart;

FIG. 6 is a fragmented perspective view showing the spring-biasing attachment end of the side arms of the clamp;

FIG. 7 is a fragmented side section view of the spring-biasing attachment end; and FIG. 8 is a top fragmented view of the spring biasing attachment end.

DESCRIPTION OF PREFERRED EMBODIMENTS

Referring now to FIG. 1, there is shown generally at 10 the top portion of a gate of a shopping cart (not shown), and to which is secured the retention clamp 11 of the present invention whereby to retain newspaper, flyers or the like articles 12 between the gate wall and the clamp 11. The clamp 11 is constituted by a pressure retention member which applies retention pressure against a large surface area of the newspaper, or like articles 12, which is retained captive between the wire wall of the end gate which consists of substantially vertically extending members 13 and opposed horizontal members 14 and 15. The pressure retention member 11 is herein constituted by a rectangular flat rigid plastic panel which may be of clear plastics whereby to more readily notice the newspaper or flyer article 12 held captive thereby.

In the lower edge of the panel 11, there is provided a pressure biasing attachment means which is constituted by a lower edge of the panel being formed as a flat wedging end edge 16. A cut-out portion 17 is provided adjacent the lower edge 16 intermediate the outer ends 18 and 19 of the panel 11. A longitudinal bore 20 extends adjacent the lower edge 16 in an enlarged area 21 formed in the lower edge of the panel and disposed across the lower edge through the cut-out portion 17. A metal wire rod 22 is disposed in the bore 20 and extends across the cut-out portion 17 and out of each of the outer ends 18 and 19 of the panel to constitute a finger extension element.

The finger extension element or end portions of the metal wire rod 22 are straight portions and are engaged on an opposed side of the straight wire members 13 at the location 23, as indicated in FIG. 1. Accordingly, the metal wire rod 22 secures the panel 11 to the end gate 10.

A clamping bracket 24 in the form of a clamping ring maintains the flat wedging end edge 16 of the panel against a straight wire member, herein horizontal member 15, of the end gate and rigidly clamps it thereover whereby to apply retention pressure to maintain the panel 11 substantially parallel to or biased against the end gate wire frame or vertical wire members 13. Since the horizontal wire 15 is of circular cross-section and the lower edge of the panel is a flat wedging end edge, it can be seen in FIG. 4 that when the panel is displaced in the direction of arrow 25, away from the end gate 10, the flat lower edge provides a wedging action tending to separate the metal wire rod 22 from the horizontal rod 15, as indicated by arrow 27, thus obtaining a restoring force "f" in the direction of arrow 26 which provides a spring-bias action to bias the panel back against the end gate 10. Accordingly, this simple pressure biasing attachment end maintains the panel biased against the wire frame to retain flat articles 12 in a throat area formed therebetween.

Referring now to FIGS. 5 to 8, there is shown another construction of the retention clamp 101. FIG. 5 shows the top portion of a gate 100 of a shopping cart (not shown) and to which is secured the retention clamp 101 of the present invention whereby to retain newspaper or the like articles 102 between the gate wall and the clamp 101. Of course, the retention clamp 101 could be secured to any wire frame wall portion of the shopping cart where it is convenient to retain newspaper-like articles as long as there are intersecting wire members.

Essentially, the clamp 101 comprises a pair of side arms 102 and an interconnecting arm 103, preferably, but not exclusively, formed integral with the side arms at an end thereof, whereby to define a substantially U-shaped clamp. Each arm 12 has a spring-biasing attachment end 104 which secures to an intersecting region 105 of straight wire members 106 and 107, herein horizontal wire member 107 and vertical extending member 106. The spring-biasing attachment ends 104 maintain the retention member 101 biased against the wire frame forming the gate 100 to define a clamping jaw for retaining such articles as newspaper, flyers, magazines, or the like flat articles, or any other article that may be conveniently retained therein.

Referring now additionally to FIGS. 6, 7, and 8, there is shown the specific configuration of the spring-biasing attachment end 104. As herein shown, the attachment end 104 is defined by a hook formation which is integrally formed with the side arms 102 and constituted by a loop portion 108 and an engaging free end portion 109. The loop portion 108 is better shown in FIG. 7, and receives therein a portion of the straight horizontal wire 107. The engaging free end portion 109 is bent forwardly to receive or to embrace an intersecting vertical wire 106' immediately above the horizontal intersecting wire 107, as better shown in FIGS. 6 and 8. The engaging free end 109 has a right angle hook bend 110, as shown in FIG. 8, adapted to locate itself forwardly of the horizontal wire 107.

The loop portion 108 is defined by a U-shaped bend in each of the side arms 102 to define a curved portion 112 and an angulated shallow V-shaped arm defined by a rearwardly extending arm portion 113 and said engaging free end portion 109 which extends forwardly and downward from the axis of said arm portion 113.

The retention clamp 101 is formed from a single length of spring wire and, as can be seen more clearly from FIG. 6, by pulling the cross arm 103 of the clamp 101 forwardly in the direction of arrow 115, the side arms 101 will flex outwardly from the U-shaped bend 112 applying torsion in the spring-biasing attachment end 104 which, together with the flexion of the side arms 102, provide a restoring force to bring back the side arms 102 against the wall of the gate 100 to close the clamp jaw. Accordingly, newspapers 102 or like articles can be positively clamped on the wall of the gate or side walls of the shopping cart.

The retention clamp 101 can easily be assembled onto a wall portion of any shopping cart by forcing the attachment ends 104 in position as shown in the drawings. Further, the side arms 102 may flex outwardly or inwardly of their long axis thus providing an adjustment to adapt the retention clamp to various different spacings of parallelly extending wire members 106 having intersecting regions with transverse wire members. Still further, the clamp may have various configurations, and although as herein shown it is of U-shape, it is conceivable that the cross arm 103 may have an outwardly extending bend therein to provide ease of finger engagement or be configured differently, not necessarily as a straight wire portion, as herein shown. Furthermore, the fact that the retention clamp does not have any coil springs or other type springs, the clamp has a longer life, and is not hazardous to children or damaging to foodstuff by other type goods placed in the shopping cart. The clamp also rests against a flat wall and does not interfere with the space provided by the shopping cart. Also, the clamp has no jagge edges and all of the joints and free ends are of rounded configuration.

It is within the ambit of the present invention to cover any other obvious modifications fall within the scope of the appended claims.

I claim:

1. A clamping panel member for attachment to a wire frame of a shopping cart to clampingly retain substantially flat articles, such as advertising papers and magazines between a wire wall section of said cart and said clamping panel member, said clamping panel member applying retention pressure at spaced apart areas of said flat articles captive between said wire wall section and said panel member, said panel member having a pressure-biasing attachment end engageable with straight wire members of said wire frame to maintain said panel member pressure biased against said wire frame to define a clamping jaw for retaining said substantially flat articles in said jaw between said panel member and said wire frame, said panel member being a flat rigid sheet-like member, said pressure biasing attachment end being provided in a lower edge of said panel member and comprising a flat wedging end edge formed in said panel member, a finger extension element extending outwardly of said lower edge in each opposed outer ends of said lower edge of said panel member and engageable with vertical straight wire members, and a clamping bracket maintaining said flat wedging end edge against a horizontal straight wire member of circular cross-section intersected by said vertical straight wire members, said panel member having a cut-out portion adjacent said lower edge intermediate said outer ends, a longitudinal bore in said panel member adjacent said lower edge and extending across said cut-out portion, a metal wire rod disposed in said bore and extending across said cut-out portion and out of each said outer ends to constitute said finger extension element, said metal wire rod extends above said horizontal straight wire, said clamping bracket being disposed about a portion of said horizontal straight wire and wire rod in said cut-out portion and applying retention pressure to bias said wire rod in the direction of said horizontal straight wire member whereby said flat wedging end edge is held against said horizontal straight wire member with said panel member lying in close proximity or on said wire wall section so as to provide a restoring force to said panel member when displaced away from said wire wall section due to the wedging action of said lower edge which applies a separating force between said horizontal straight wire and wire rod.

2. A retention clamp as claimed in claim 1 wherein said panel member is a rectangular flat rigid plastic panel.

3. A retention clamp as claimed in claim 2 wherein said plastic panel is a transparent plastic panel.

4. A clamping panel member in combination with a shopping cart having a wire frame, said clamping panel member being attached to said wire frame to clampingly retain substantially flat articles, such as advertising papers and magazines between a wire wall section of said cart and said clamping panel member, said clamping panel member applying retention pressure at spaced apart areas of said flat articles captive between said wire wall section and said panel member, said panel member having a pressure-biasing attachment end engageable with straight wire members of said wire frame to maintain said panel member pressure biased against said wire frame to define a clamping jaw between said panel member and said wire frame, said panel member being a flat rigid sheet-like member, said pressure biasing attachment end being provided in a lower edge of said panel member and comprising a flat wedging end edge formed in said panel member, a finger extension element extending outwardly of said lower edge in each opposed outer ends of said lower edge of said panel member and engageable with vertical straight wire members by wedging each said finger extension element transversely with one or more of said vertical straight wire members of said wire wall section outwardly of said outer ends, and a clamping bracket maintaining said flat wedging end edge against a horizontal straight wire member of said wire wall section, said horizontal straight wire member being of circular cross-section and intersected by said vertical straight wire members.

* * * * *